（12）United States Patent
Xie et al.

(10) Patent No.: US 10,239,238 B2
(45) Date of Patent: Mar. 26, 2019

(54) METHOD FOR FAST BUILDING THREE-DIMENSION POLYMER STRUCTURES BASED ON DIGITAL LIGHT PATTERNING

(71) Applicant: ZHEJIANG UNIVERSITY, Hangzhou, Zhejiang Province (CN)

(72) Inventors: Tao Xie, Hangzhou (CN); Jingjun Wu, Hangzhou (CN); Qian Zhao, Hangzhou (CN); Limei Huang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 155 days.

(21) Appl. No.: 15/486,128

(22) Filed: Apr. 12, 2017

(65) Prior Publication Data

US 2017/0297234 A1    Oct. 19, 2017

(30) Foreign Application Priority Data

Apr. 15, 2016 (CN) .......................... 2016 1 0239890
Apr. 15, 2016 (CN) .......................... 2016 1 0240198

(51) Int. Cl.
| | |
|---|---|
| *B29C 35/08* | (2006.01) |
| *B29C 71/00* | (2006.01) |
| *B29C 35/02* | (2006.01) |
| *B29K 105/00* | (2006.01) |
| *B29K 63/00* | (2006.01) |

(52) U.S. Cl.
CPC ...... *B29C 35/0805* (2013.01); *B29C 35/0266* (2013.01); *B29C 71/0009* (2013.01); *B29C 2035/0827* (2013.01); *B29K 2063/00* (2013.01); *B29K 2105/0002* (2013.01)

(58) Field of Classification Search
CPC ............ B29C 35/0805; B29C 35/0266; B29C 71/0009; B29C 2035/0827; B29K 2105/0002; B29K 2063/00
See application file for complete search history.

(56) References Cited

U.S. PATENT DOCUMENTS

| | | | | |
|---|---|---|---|---|
| 9,360,757 | B2 * | 6/2016 | DeSimone | ............. B33Y 10/00 |
| 2016/0046075 | A1 * | 2/2016 | DeSimone | ............. B33Y 30/00 |
| | | | | 264/401 |
| 2016/0083516 | A1 * | 3/2016 | Elomaa | .................... C08L 77/04 |
| | | | | 525/54.1 |
| 2016/0136889 | A1 * | 5/2016 | Rolland | ................. B33Y 10/00 |
| | | | | 264/1.27 |
| 2017/0210077 | A1 * | 7/2017 | Ermoshkin | ............ B33Y 10/00 |

\* cited by examiner

*Primary Examiner* — Sanza L. McClendon
(74) *Attorney, Agent, or Firm* — Jiwen Chen

(57) ABSTRACT

The present disclosure concerns a digital fabricating method for constructing 3D structures, comprising the following steps: (a) precursor consist of monomers and photo-initiator is introduced into reaction cell; (b) exposing the precursor to the DLP projector for several times to gain an inhomogeneous sheet; (c) swelling the sheet in solvent to gain 3D structure. The disclosure provides a simple and easy way to produce precise 3D structure.

10 Claims, 3 Drawing Sheets

METHOD FOR FAST BUILDING THREE-DIMENSION POLYMER STRUCTURES BASED ON DIGITAL LIGHT PATTERNING

This application claims the priority benefit of Chinese Application No. 201610240198.X, filed Apr. 15, 2016 and Chinese Application No. 201610239890.0, filed Apr. 15, 2016, which are all hereby incorporated by reference.

TECHNICAL FIELD

The present invention generally relates to the field of polymer processing and manufacturing and, more particularly, to a method for fast building three-dimension structures.

BACKGROUND TECHNOLOGY

Polymeric articles with three-dimensional (3D) structures are usually manufactured by different molding methods. However, due to the limitation of the mold development and de-molding process, only 3D objects with simple structures can be obtained. Moreover, the molding process has the disadvantage of long development cycle of the molds, large investment and low efficiency.

3D printing, also known as additive manufacturing, is a process used to synthesize a 3D object in which successive layers of material are accumulated layer by layer under computer control to create the object. 3D printing is a directly prototyping technology which can create almost any shape or geometry from digital 3D data without any specific molds. It has been widely used in molding, industrial or art design, and direct fabrication of some products. However, the time for printing a single object is relatively long because of the layer by layer printing manner for all kinds of 3D printing technology such as Fused Deposition Modeling (FDM), Stereo Lithography Apparatus (SLA), Digital Light Processing (DLP), Selective Laser Sintering (SLS) and so on. The printing time significantly increases if a higher resolution is acquired, for the object should be cut into much thinner layers in this case. Although the technology of CLIP (Continuous Liquid Interface Production) from Carbon 3D company has relatively improved the printing speed, the absolute printing speed is still low.

Transforming a heterogeneous 2D sheet into a 3D structure under a certain condition is a unique manufacturing technology. The basic principle is introducing a chemical structure distribution inside a polymer matrix to yield a heterogeneous material. The chemical structure distribution can be a crosslinking density variety across the network, which can induce a certain internal stress. The internal stress can be released under certain conditions, leading the mechanical unsteady heterogeneous sheet transfer into a specific 3D structure. The design and fabrication of 2D sheet are easy and fast, as well as that of the transforming process. So the above-mentioned method can be a potential technique for fast constructing 3D structures. So far, the heterogeneous 2D sheet is mainly constructed through introducing a locally secondary network into a primary homogeneous network. The distribution of the secondary network, which determines the final 3D structure, is mainly introduced by using a photo mask. In this case, only simple 3D structure can be created because of the physical limitation of the photo mask.

SUMMARY OF THE INVENTION

The present invention discloses a method for fast constructing 3D polymer materials, using the digital light patterning technique to precisely achieve a heterogeneous 2D polymer sheet. The obtained heterogeneous 2D sheet will transform into a 3D structure previously defined under certain conditions.

A method to create 3D polymer structures based on digital light patterning, comprising the following steps:

Step 1: placing the photo-curable precursors (comprising monomers and photo initiators) into a flat reaction cell;

Step 2: using the DLP-type projector to illuminate and cure the precursor locally and cumulatively, getting a heterogeneous 2D polymer sheet;

Step 3: swelling the 2D polymer sheet in a certain solvent or heat the sheet until reaching an equilibrium 3D structure.

In the present invention, the digital light patterning technology means using the DLP-type projector to define the micro chemical structure pattern within a 2D polymer sheet. The projector can illuminate the photo-curable precursors spatially with different exposure time or intensity (gray degree of the illumination light) at each pixel level, which is the critical process in this invention. The heterogeneous exposure will induce a pixelated heterogeneous distribution of the cross-linking density and reaction conversion across the 2D polymer sheet. The difference in crosslinking density and reaction conversion will cause the polymer to possess different swelling degrees in certain solvents. So the sheet will convert into a 3D structure after equilibrium swelling because of the internal stress existing between the different regions. In addition, the reaction conversion difference will also cause the internal stress, which will be released and induce a 3D structure after removal of the unreacted reagents. The final 3D structure is precisely determined by the heterogeneous exposure. Working backward from the final 3D structure to the swollen degree distribution or the monomer residual distribution couples with the polymerization kinetics of the photosensitive precursor, the illumination time and illumination region can be determined.

In the present invention, the DLP-type projector is connected to the computer by G code, projecting specific 2D graphics to the surface of photo-curable precursors. The precursors under illuminated are initiated and polymerize.

In the present invention, the photo-curable precursors in step 1 include polymerizable monomers and photo-initiators.

The monomers comprise reactive groups which can be activated and polymerize under illumination in the presence of photo-initiator. The precursors can be a mixture of different monomers, at least one of which contains two or more than two reactive groups, to guarantee the precursor to polymerize into a cross-linked network.

Advantageously, the monomers are chosen from (meth) acrylates monomers or epoxy monomers.

The (meth) acrylates monomers have at least two (meth) acrylate groups. The (meth) acrylate groups can be activated by the photo-initiators under the radical polymerization mechanism.

The epoxy monomers have at least two epoxy groups. The epoxy groups can be activated by the photo-initiators under the cationic polymerization mechanism.

In specific embodiments, the (meth) acrylate monomers are chosen from polyethylene glycol di(meth)acrylate, ethyleneglycol dimethacrylate, epoxy acrylate resin, polyurethane acrylate resin, polyester acrylate resin, urethane acrylate resin, or a combination thereof.

In specific embodiments, the epoxy monomers are chosen from bisphenol A epoxy, bisphenol F epoxy, cycloaliphatic epoxy, or a combination thereof.

All the listed acrylate or epoxy monomers have at least two reactive groups and can self polymerize into a cross-linked polymer network.

In order to adjust or tune the viscosity of the precursor and the mechanical property of the final polymer, (meth) acrylate monomers with mono functional group are selectively added to the precursors. The chemical structure is shown as follows:

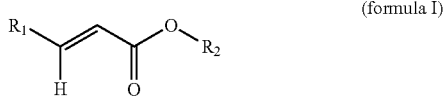

(formula I)

Wherein, $R_1$ is methy or hydrogen, $R_2$ is alkyl with 1 to 20 carbons. Advantageously, the described acrylate monomers can be chosen from methyl (meth) acrylate, ethyl (meth) acrylate, butyl (meth) acrylate, octyl (meth) acrylate, kwai (meth) acrylate, cyclohexyl (meth) acrylate, isobornyl (meth) acrylate, 2-hydroxyethyl (meth) acrylate, 2-Hydroxypropyl (meth) acrylate, and the combination thereof.

The mono-functional (meth) acrylate monomer accounts for 60-95% of the total monomers. More specifically, the mono-functional (meth) acrylate monomer accounts for 80-95% of the total monomers.

Advantageously, in the case of epoxy-type precursor, the epoxy monomers are novolac epoxy, bisphenol A diglycidyl ether, bisphenol F diglycidyl ether, pentaerythritrol polyglycidyl ether, tetrabromobisphenol A diglycidyl ether, 1,6-hexanediol diglycidyl ether, bisphenol A poly (ethylene glycol) diglycidyl ether, polyunsaturated fatty acid epoxy, plant oil epoxy, or the combination thereof.

Reactive diluent, a kind of low molecular compound with one epoxy group, is selectively added to the precursor. Advantageously, the reactive diluent can be chosen from butyl glycidyl ether, phenyl glycidyl ether, allyl glycidyl ether, or the combination thereof. The amount of the reactive diluent ranges 60-95% of the total epoxy monomers by weight.

Proper photo-initiators are included in the photo-curable precursors. For the acrylate-type precursor, radical photo-initiators are applied. For the epoxy-type precursor, cationic photo-initiators are applied. Preferably, the amount of the photo-initiator is between 0.05% and 0.5% by weight.

Radical photo-initiators can be chosen from benzoin, benzoin dimethyl ether, 2-phenylacetophenone, benzoin dimethyl ether, hydroxyalkyl phenyl ketone, aroyl phosphorus oxide, diphenyl ketone, 2,4-Dihydroxybenzophenone, 2-isopropylthioxanthone, or a combination thereof.

Cationic photo-initiators can be chosen from diaryliodonium salts, triaryliodonium salts, alkyl iodonium salt, cumene ferrocene hexafluorophosphate, or a combination thereof.

The photo-curable precursors with the above-mentioned formulations are charged into a sealed transparent reaction cell. The reaction cell is advantageously made of quartz glass surface modified by vapor deposition of perfluorodecyltriethoxysilane. The thickness of the reaction cell has a great influence on the projection and curing process. Advantageously, the reaction cell is constructed by piling up two glass sheets separated with a PDMS spacer and the thickness can be in the range of 0.5 mm to 5 mm.

The thickness of the photo-curable precursors is equal to the thickness of the spacer.

The critical step is how to cure the precursors. In the present invention, the DLP-type projector is used to illuminate and cure the precursor locally and cumulatively. The process is termed digital light patterning. The computer-controlled projector allows dynamic spatial control of the light exposure area and time at each pixel level. The difference in exposure time (thus light dose) creates pixelated polymer networks with variable degree of monomer conversion and cross-linking density.

Due to the different cross-linking density, subsequent immersion of the obtained polymer sheet in proper solvent induces differential swelling in the pixelated sample, creating stresses that turn the 2D polymer sheet into a 3D object. When the photo-cured polymer is hydrophilic, the solvent can be aqueous solutions. When the polymer is hydrophobic, the solvent can be chosen from common organic solvent, such as ethyl acetate, butyl acetate, methylene chloride, chloroform, benzene, toluene, THF, DMF, as long as the solvent can swell the polymer. Melted wax can also be used to swell a polymer especially when there are long aliphatic side chains suspending on the cross-linked networks. A benefit of using melted wax is the wax-swollen 3D polymer object can turn into a rigid material upon cooled to room temperature due to the crystallization of the wax.

In another way, the monomer conversion in different areas is also different, which means in some areas there are residual monomers. Removal of the unreacted monomers, either by extraction by proper solvents or volatilization by just heating the sample, can also create internal stress, which can also induce a 2D to 3D transition.

The DLP-type projector in the present invention can be any DMD-based commercial projector such as Vivitek D538W-3D. The projector is connected a computer through open source G-codes to control the light exposure.

The regular wavelength of the light source of the commercial projector is around 400-700 nm. If shorter wavelength such as 365 nm or 315 nm is essential for activating the photo-initiator, the light source of the projector can be substituted. In this case, some optical device such as the lens in the light path should be modified.

The polymerization kinetics of the precursors should be studied to determine the exposure time.

The logics of the current process is as follows:

The internal stress for a 2D polymer sheet to transform into a 3D structure is first simulated (the mechanical properties such as the elastic modulus should taken into consideration during the simulation). The internal stress is induced by the swelling degree variation in the sheet or the removal of the unreacted monomers. Then, the cross-linking density distribution (related to the swelling degree) and the reaction conversation (related to the monomer residual) distribution can be obtained. According to the polymerization kinetics, the exposure time and area can be obtained.

Compared with the existing technology, the benefits of the present invention are:

(1) The heterogeneous chemical structure within the 2D polymer sheet is precisely defined by the computer and projector. The distribution of the cross-linking density and monomer conversion can be arbitrarily controlled, which means the final 3D structure can also be arbitrarily controlled.

(2) The 2D sheet can be constructed within several seconds. The time for post treatment such as removal of the residual is a little bit longer. However, a large batch of the 2D sheet can be treated at the same time to improve the efficiency.

DETAILED DESCRIPTION OF THE INVENTION

Exemplary embodiments below are detailed descriptions of the present invention. However, the scope of protection is not restricted to exemplary embodiment below.

Apparatus

Figure 1:
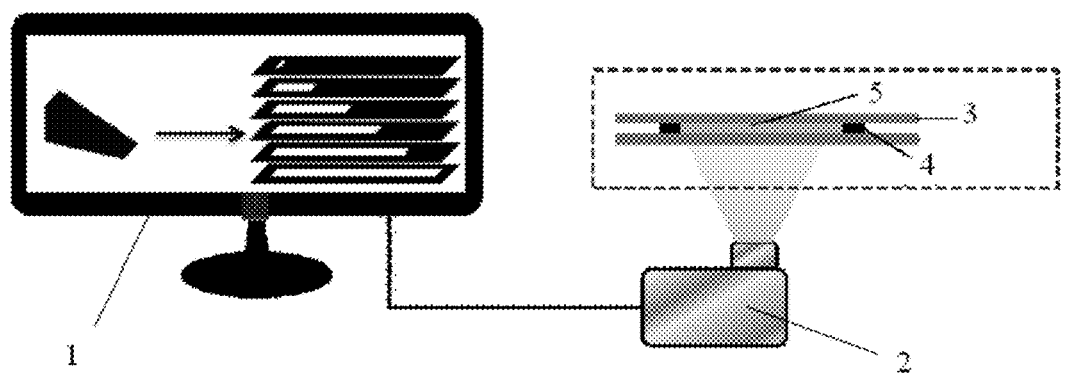
FIG. 1 is the schematic representation of the apparatus for the digital light patterning.

FIG. 1 shows the schematic representation of the apparatus for the digital light patterning, comprising a computer (1), a DLP projector (2) and a reaction cell. The reaction cell comprises two quartz glasses (3) and silicon spacer (4), filled with photosensitive precursor (5). The wavelength of light source is 400-700 nm.

The DLP projector is connected with a computer via G code. The projecting layout are designed with CAD and then transferred to the projector. Locally and cumulatively projecting on the precursor (5) cures the resin and gains a heterogeneous sheet. Swelling the sheet in proper solvent or heating the sheet to remove the monomer residual can both resulted in a 3D structure.

Example 1 Hydrophilic Acrylate Resin-Swelling

Figure 2:
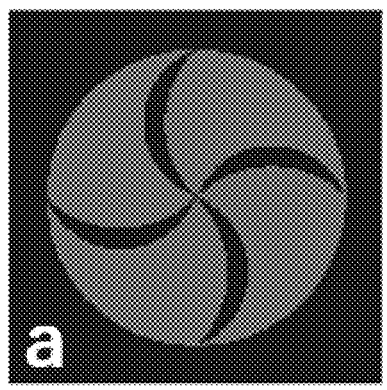
FIG. 2 is the schematic diagram of the defined 2D sheet and resulted 3D structure after swelling equilibrium for example 1.
Figure 2:
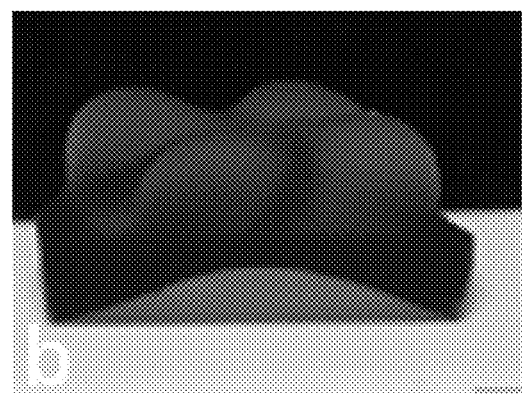

Materials:
a) Hydroxyethyl acrylate (HEA), from Sigma-Aldrich company;
b) Potassium 3-sulfopropylmethacrylate (PSPMA), from Sigma-Aldrich company;
c) Ethylene glycol dimethacrylate (EGDMA), from Sigma-Aldrich company;
d) Bis(2,4,6-trimethylbenzoyl)-phenylphosphineoxide (Irgacure 819), from Sigma-Aldrich company;

The precursor was made by mixing up the monomers with mass ratio of HEA:PSPMA:EGDMA=1:0.1:0.01 and adding 0.5 wt % Irgacure 819 as the photo-initiator. Then the precursor was introduced into the reaction cell with a syringe and the reaction cell was placed 15 cm below the projector The planar light exposure layout was schematically shown in FIG. 2a. Lighter color represented shorter light exposure.

Swelling: the obtained 2D sheet was immersed into DI water, and it turned into a steady 3D structure (FIG. 2b) after reaching a swelling equilibrium.

Example 2 Epoxy Resin-Swelling

Materials:
(a) Poly(ethylene glycol) diglycidyl ether (DER732), from Sigma-Aldrich company;
(b) Ethyl acetate (EA), from Sinopharm Chemical Reagent Co., Ltd;
(c) (4-Methylphenyl) [4-(2-methylpropyl)phenyl] iodonium hexafluorophosphate (Irgacure 250), from Shenzhen u-sunny technology co., Ltd;

The precursor was made by mixing up the monomers with mass ratio of DER732:EA:Irgacure 250=1:0.2:0.005. Then the precursor was introduced into the reaction cell (spacer thickness of 1 mm) with syringe and the reaction cell was placed 15 cm below the projector.

Figure 3:
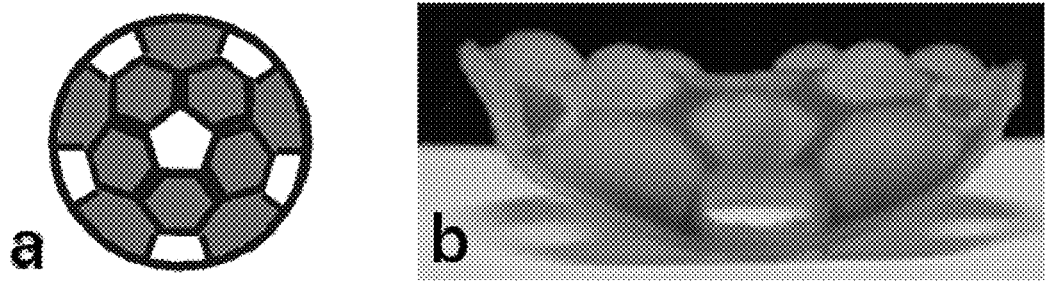
FIG. 3 is the schematic diagram of the defined 2D sheet and resulted 3D structure after swelling equilibrium for example 2.
Figure 4:
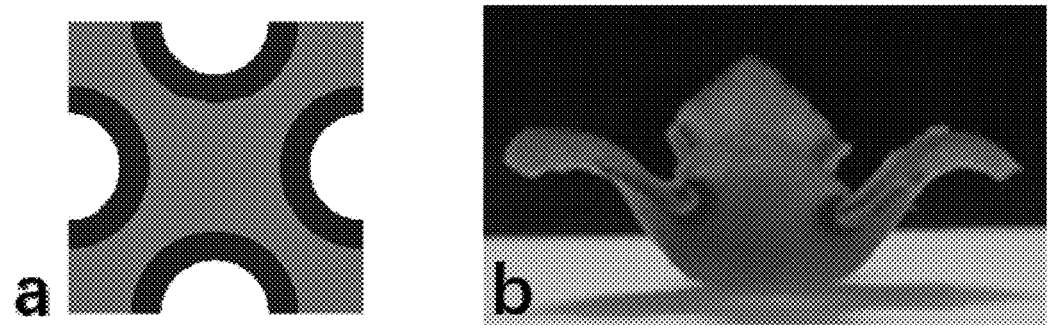
FIG. 4 is the schematic diagram of the defined 2D sheet and resulted 3D structure after swelling equilibrium for example 3.

The planar light exposure layout was schematically shown in FIG. 3a.

The obtained 2D sheet was immersed into ethyl acetate, and it turned into a steady 3D structure (FIG. 3b) after reaching a swelling equilibrium.

Example 3 Hydrophobic Acrylate Resin-Swelling

Materials:
(a) butyl acrylate (BA), from Sigma-Aldrich company;
(b) Ethylene glycol dimethacrylate (EGDMA), from Sigma-Aldrich company;
(c) Bis(2,4,6-trimethylbenzoyl)-phenylphosphineoxide (Irgacure 819), from Sigma-Aldrich company;

The precursor was made by mixing up the monomers with mass ratio of BA:EGDMA:Irgacure 819=1:0.01:0.005. Then the precursor was introduced into the reaction cell (spacer thickness of 1 mm) with syringe and the reaction cell was placed 15 cm below the projector.

The planar light exposure layout was schematically shown in FIG. 3a.

The obtained 2D sheet was immersed into butyl acetate acetate, and it turned into a steady 3D structure (FIG. 3b) after reaching a swelling equilibrium.

Example 4 Hydrophobic Acrylate Resin-Residual Removal

Materials:
a) Hydroxyethyl acrylate (HEA), from Sigma-Aldrich company;
b) Ethylene glycol dimethacrylate (EGDMA), from Sigma-Aldrich company;
c) Bis(2,4,6-trimethylbenzoyl)-phenylphosphineoxide (Irgacure 819), from Sigma-Aldrich company;

The precursor was made by mixing up the monomers with mass ratio of HEA:EGDMA=1:0.01 and adding 0.5 wt % Irgacure 819 as photo-initiator. Then the precursor was introduced into the reaction cell with syringe and the reaction cell was placed 15 cm below the projector.

Figure 5:
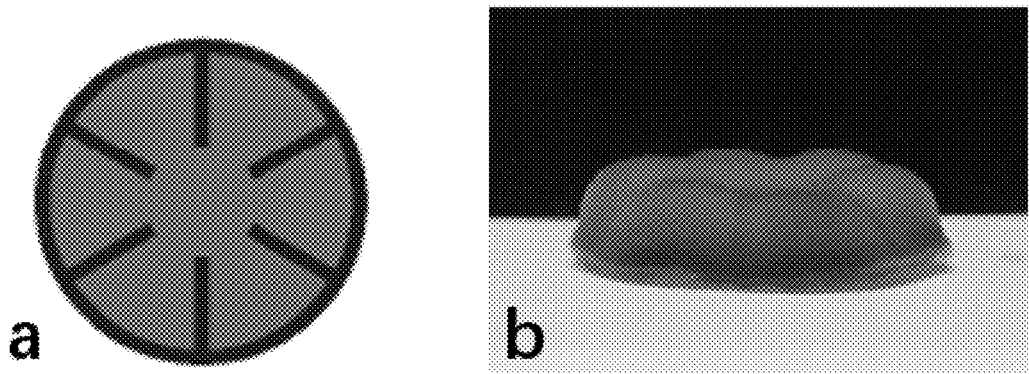
FIG. 5 is the schematic diagram of the defined 2D sheet and resulted 3D structure after removal of the residual for example 4.
Figure 6:
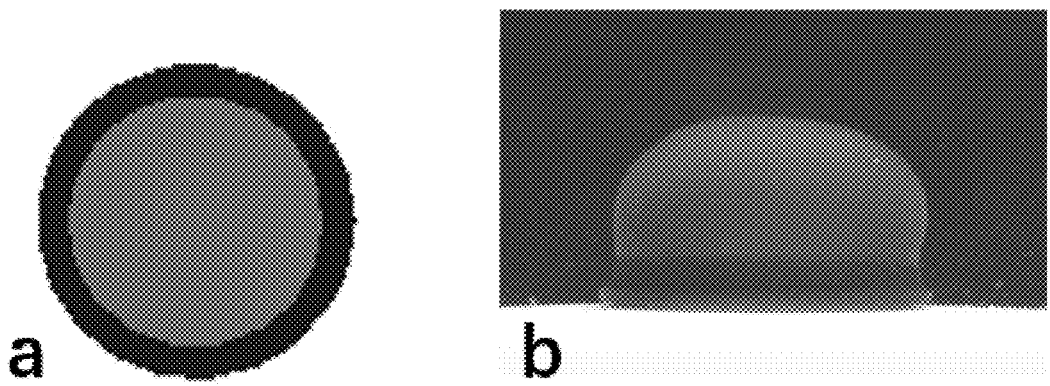
FIG. 6 is the schematic diagram of the defined 2D sheet and resulted 3D structure after removal of the residual for example 5.

The planar light exposure layout was schematically shown in FIG. 5a.

The obtained 2D sheet was heated in an oven under the temperature of 80° C., and it turned into a steady 3D structure (FIG. 5b) after the unreacted monomers were removed through evaporation.

Example 5 Hydrophobic Acrylate Resin-Residual Removal

Materials:
(a) Poly(ethylene glycol) diglycidyl ether (DER732), from Sigma-Aldrich company;
(b) Butyl glycidyl ether (BGE), from Sinopharm Chemical Reagent Co., Ltd;

(c) (4-Methylphenyl) [4-(2-methylpropyl)phenyl] iodonium hexafluorophosphate (Irgacure 250), from Shenzhen u-sunny technology co., Ltd;

The precursor is made by mixing up the monomers with mass ratio of DER732:BGE:Irgacure 250=1:0.2:0.005. Then introduce the precursor into the reaction cell (spacer thickness of 1 mm) with syringe and place the reaction cell 15 cm below the projector.

The planar light exposure layout was schematically shown in FIG. 5a.

The obtained 2D sheet was heated in an oven under the temperature of 100° C., and it turned into a steady 3D structure (FIG. 5b) after the unreacted monomers were removed through evaporation.

The invention claimed is:

1. A method for constructing 3D polymer structures with digital light patterning technology, comprising the following steps: (a) introducing photo-curable precursors comprising monomers and photo-initiators into a flat reaction cell; (b) using a DLP-type projector to illuminate and cure the precursor locally and cumulatively, getting a heterogeneous 2D polymer sheet; (c) swelling the 2D polymer sheet in a certain solvent or heat the sheet until reaching a equilibrium 3D structure.

2. The method of claim 1, wherein the monomers can be chosen from acrylate monomers and epoxy monomers, the acrylate monomers have at least two acrylate functional groups; the epoxy monomers have at least two epoxy functional groups.

3. The method of claim 2, wherein the acrylate monomers can be chosen from poly(ethylene glycol) diacrylate, ethylene glycol diacrylate, epoxy acrylate, polyurethane acrylate, polyester acrylate and amino acrylic resin; the epoxy monomers can be chosen from bisphenol A epoxy, bisphenol F epoxy and cycloaliphatic epoxy.

4. The method of claim 3, wherein the acrylate monomers selectively include a monomer with one acrylate functional group; the epoxy monomers selectively include a monomer with one epoxy functional group as reactive diluent.

5. The method of claim 1, wherein the radical photo-initiator is chosen for the acrylate monomer, the cationic photo-initiator is chosen for the epoxy monomer, the amount of the photo-initiator ranges from 0.1 to 5% by weight.

6. The method of claim 5, wherein the radical photo-initiator can be chosen from benzoin, benzoin dimethyl ether, 2-phenylacetophenone, benzoin dimethyl ether, hydroxyalkyl phenyl ketone, aroyl phosphorus oxide, diphenyl ketone, 2,4-Dihydroxybenzophenone, 2-isopropylthioxanthone and cationic photo-initiator can be chosen from diaryliodonium salts, triaryliodonium salts, alkyl iodonium salt, cumene ferrocene hexafluorophosphate.

7. The method of claim 1, wherein the reaction cell is constructed by piling up two quartz glass sheets separated with silicon spacer and the spacer thickness is in the range of 0.3 mm to 5 mm.

8. The method of claim 1, wherein the DLP-type projector is connected to a computer through an open source G-code and graphics software.

9. The method of claim 1, wherein the light source of the projector can be a mercury lamp with all band ultraviolet or a LED lamp with specific wavelength coincidence with the photo-initiator such as 315 nm, 365, 405 nm.

10. The method of claim 1, wherein the solvent used to swell the 2D polymer sheet is chosen according to the hydrophilicity of the polymer.

* * * * *